US006741541B2

United States Patent
Akatani et al.

(10) Patent No.: US 6,741,541 B2
(45) Date of Patent: May 25, 2004

(54) DISK PLAYER

(75) Inventors: Shigeru Akatani, Tokyo (JP); Takashi Kouso, Tokyo (JP)

(73) Assignee: Tanashin Denki Co., Ltd., Tokyo (JP)

( * ) Notice: Subject to any disclaimer, the term of this patent is extended or adjusted under 35 U.S.C. 154(b) by 277 days.

(21) Appl. No.: 10/105,194

(22) Filed: Mar. 26, 2002

(65) Prior Publication Data

US 2003/0039198 A1 Feb. 27, 2003

(30) Foreign Application Priority Data

Aug. 21, 2001 (JP) ........................................ 2001-250211

(51) Int. Cl.⁷ ........................... G11B 17/04; G11B 21/02
(52) U.S. Cl. ...................................... 369/219; 369/77.1
(58) Field of Search ............................ 369/215, 219, 369/223, 75.1, 75.2, 77.1, 77.2, 30.98; 360/99.06, 99.07

(56) References Cited

U.S. PATENT DOCUMENTS

| 5,237,555 | A | * | 8/1993 | Tsuruta et al. ............. 369/77.2 |
| 5,251,195 | A | * | 10/1993 | Kawakami et al. ........ 369/75.2 |
| 5,500,844 | A | * | 3/1996 | Kim et al. .................. 369/77.2 |
| 5,636,198 | A | * | 6/1997 | Maeng ........................ 369/191 |
| 6,295,266 | B1 | * | 9/2001 | Lee et al. ................... 369/77.1 |
| 6,411,582 | B1 | * | 6/2002 | Nakatani et al. ........... 369/75.2 |
| 6,563,778 | B2 | * | 5/2003 | Tanaka et al. .............. 369/77.1 |
| 6,597,651 | B1 | * | 7/2003 | Kage et al. ................. 369/77.1 |

FOREIGN PATENT DOCUMENTS

| JP | 3-147562 | * | 6/1991 |
| JP | 2000-298903 | | 4/1999 |

* cited by examiner

Primary Examiner—David Ometz
(74) Attorney, Agent, or Firm—Reed Smith LLP; Stanley P. Fisher, Esq.; Juan Carlos A. Marquez, Esq.

(57) ABSTRACT

It is an object of the present invention to simplify a structure for alternatively transmitting power to a pickup moving mechanism and a disk loading mechanism by a common motor. A worm gear is attached to the rotary shaft of a motor, a worm wheel meshing this worm gear is supported on a mobile plate 8 that is movable along the rotary shaft of the motor, and first and second gears which are positioned in right and left of the worm wheel to be alternatively capable to engage with the worm wheel are arranged. The pickup moving mechanism is operated by the mesh of the first gear and the worm wheel, and the disk loading mechanism is operated by the mesh of the second gear and the worm wheel.

6 Claims, 8 Drawing Sheets

DISK PLAYER

BACKGROUND OF THE INVENTION

1. Field of the Invention

The present invention relates to a disk player in which a pickup moving mechanism and a disk loading mechanism are alternatively operated by a common motor.

2. Description of the Related Art

Japanese Patent Application Laid-Open No. 2000-298903 discloses a structure in which a pickup moving mechanism and a disk loading mechanism are alternatively operated by a common motor. Here, the torque of the motor is transmitted to a worm wheel via a worm gear, and a switching gear is revolved around a large diameter gear in accordance with the rotation direction of the large diameter gear engaging the worm gear. By making the switching gear engage either gear of the pickup moving mechanism side or the disk loading mechanism side, the torque of the motor is alternatively transmitted either to the pickup moving mechanism or the disk loading mechanism.

In the disk player described above, in order that the switching gear is reliably revolved around the large diameter gear in accordance with the rotation direction of the large diameter gear, it is necessary to dispose a guide gear on the rotation track of the switching gear. Accordingly, there are problems that a space for disposing the guide gear is necessary and that the number of parts increases, causing the structure to be complex. Further, it is desired that the movement of the pickup is completely inhibited at non-playback time of a disk.

SUMMARY OF THE INVENTION

It is an object of the present invention to provide a disk player of a simple structure in which the switching of the rotation transmission path between the pickup moving mechanism and the disk loading mechanism can be reliably executed employing a small number of parts and in which the movement of the pickup can be completely inhibited at non-playback time of a disk.

A disk player according to a first invention is constructed so that power of a motor is alternatively transmitted to a pickup moving mechanism and a disk loading mechanism via a worm wheel by attaching a worm gear on a rotary shaft of the motor and by supporting the worm wheel on a movable member which is reciprocatively movable in a direction approximately parallel to the axis of the worm gear to move the worm wheel together with the movable member by the thrust of the worm gear.

At the time of operation of the disk loading mechanism the movement of the movable member is inhibited by a first movable member lock mechanism, and at the time of operation of the pickup moving mechanism the movement of the movable member is inhibited by a second movable member lock mechanism.

With this structure, since the worm wheel receives thrust from the worm gear and can reliably move between the pickup moving mechanism side and the disk loading mechanism side, the structure can be made simple.

In a second invention, by inhibiting the movement of the pickup by a pickup lock mechanism with the movement of the worm wheel from the pickup moving mechanism side to the disk loading mechanism, the movement of the pickup can be reliably inhibited at the time of operation of the disk loading mechanism.

The movable member may be moved along a linear guide as in a third invention and may be rotatable about a support shaft as in a fourth invention.

DESCRIPTION OF THE PREFERRED EMBODIMENTS

Figure 1:
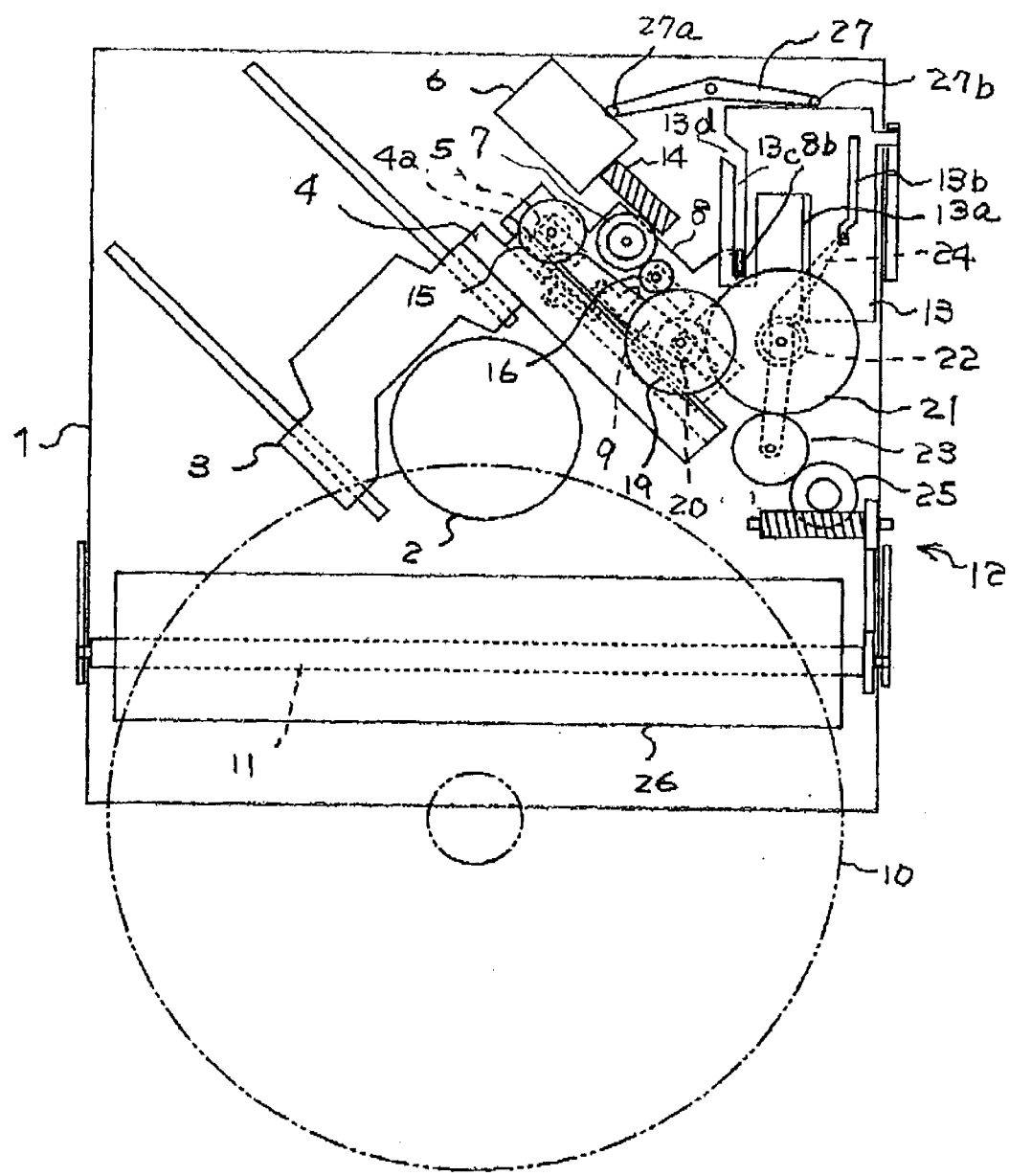
FIG. 1 is a plan view illustrating a first embodiment of a disk player according to the present invention.

FIG. 1 to FIG. 6 illustrate a first embodiment of the present invention. FIG. 1 is a schematic structural view of a disk player. A turntable 2 is disposed on the center of a substrate 1 of the disk player, and a pickup 3 is movably attached from the turntable 2 toward a corner of the substrate 1. A pickup moving mechanism for moving the pickup 3 is composed of a rack plate 4 integrated with the pickup 3, a pinion gear 5 meshing with a rack 4a of the rack plate 4, a worm wheel 7 transmitting the rotation of a motor 6 to the pinion gear 5, a mobile plate 8 (movable member) supporting the worm wheel 7, and a rotation plate 9 regulating the movement of the rack plate 4. Disposed on the substrate 1 is a disk loading mechanism for moving a disk 10 between an insertion slot and a playback position of the disk. This disk loading mechanism is composed of a carrier roller 11 disposed in the insertion slot side of the substrate, a roller driving gear group transmitting the rotation of the motor 6 to the carrier roller 11 only during the time the disk is carried, and a control plate 13 interrupting the rotation transmission of the roller driving gear group after the disk is carried.

Figure 2:
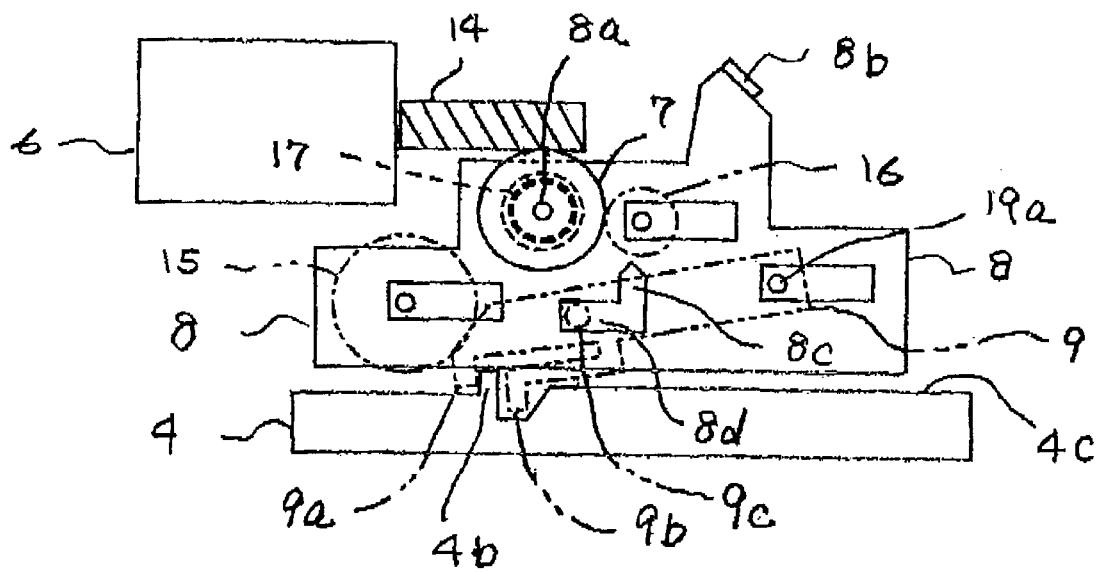
FIG. 2 is a view illustrating a main part of the first embodiment.

A worm gear 14 is inserted to by pressure and is fixed on the rotary shaft of the motor 6. First and second gears 15, 16 are arranged to be alienated from each other at a predetermined interval in both sides of the worm wheel 7 which meshes with the worm gear 14. The worm wheel 7 is fixed on a support shaft 8a of the mobile plate 8, and the mobile plate 8 is movably attached to the substrate 1 in a direction approximately parallel to the rotary shaft of the motor 6. A compression coil spring 17 is inserted between the worm wheel 7 and the mobile plate 8 as shown in FIG. 2 so that the compression coil spring 17 imparts rotation resistance to the worm wheel 7. The worm wheel 7 and the mobile plate 8 are given thrust by the rotation of the worm gear 14 due to the existence of the rotation resistance and are moved in one direction or another in accordance with the rotation direction of the worm gear 14.

The first gear 15 transmits power to the rack plate 4 via the pinion gear 5, and the second gear 16 is arranged so as to transmit torque to a third gear 19 that is to be a first stage of the roller driving gear group. This third gear 19 transmits rotation to a fifth gear 21 via a fourth gear 20 integrated with the third gear 19, and when a sixth gear 22 integrated with the fifth gear meshes with a rack 13a of the control plate 13, the control plate 13 advances/retreats in accordance with the rotation direction of the fifth gear 21. A seventh gear 23 meshes with the fifth gear 21 all the time. This seventh gear 23 is attached to one end of a support plate 24 that is rotatably supported by a support shaft 21a of the fifth gear 21. The other side of the support plate 24 meshes with a cam groove 13b formed in the control plate 13. This cam groove 13b makes the support plate 24 rotate so that an eighth gear 25 that transmits the rotation of the seventh gear 23 to the carrier roller 11 is meshed with before the rack 13a of the control plate meshes with the sixth gear 22. That is, during the time before the rack 13a of the control plate meshes with the sixth gear 22, the rotation of the second gear 16 is transmitted up to the carrier roller 11. When the carrier roller 11 rotates, the disk 10 sandwiched by the carrier roller 11 and a guide plate 26 is carried between the disk insertion slot and the playback position on the turntable.

A first lock mechanism maintaining an meshing state with the worm wheel 7 and the second gear 16 while the disk is carried is formed in the mobile plate 8 and the control plate 13. A bent piece 8b is formed in one end of the mobile plate 8, and a long groove 13c accommodating this bent piece 8b is formed in the control plate 13 along the moving direction of the control plate 13. An opening 13d for letting the bent piece 8b pass is formed in one end of this long groove 13c. While the bent piece 8b is accommodated in the long groove 13c, the control plate 13 inhibits the movement of the mobile plate 8 so as to maintain the meshing state with the worm wheel 7 and the second gear 16.

A second lock mechanism inhibiting the movement of the control plate 8 to maintain an meshing state with the worm wheel 7 and the first gear 15, at the time of disk playback, is provided between the mobile plate 8 and the rack plate 4. An L-shaped hole is provided in the mobile plate 8 as shown in FIG. 2. This L-shaped hole is formed by a recess 8c recessed in the direction perpendicular to the moving direction of the mobile plate 8 and a long hole 8d parallel to the moving direction of the mobile plate. The rotation plate 9 is rotatably attached to the rotary shaft 19a of the third gear 19. First and second protrusions 9a, 9b are formed in a rotating tip of the rotation plate 9, and a pin 9c that is fitted into the L-shaped hole is provided on a middle portion thereof. On the rack plate 4 formed are a third protrusion 4b sandwiched between the first and second protrusions 9a, 9b of the rotation plate 9 and a long-sized guide 4c engaging the tip of the second protrusion 9b to fix the pin 9c at a position where the pin 9c is pushed into the recess 8c. When the pickup starts moving for disk playback, the rotation plate 9 is rotated so that the third protrusion 4b of the rack plate 4 pushes up the first protrusion 9a of the rotation plate 9 to make the pin 9c be fitted into the recess 8c of the L-shaped hole. By making the pin 9c be fitted into the recess 8c, the movement of the mobile plate 8 is regulated in a state where the engagement between the worm wheel 7 and the first gear 15 is maintained after the movement of the pickup is started.

A pickup lock mechanism inhibiting the movement of the pickup 3 while a disk is loaded is composed of the first and second protrusions 9a, 9b of the rotation plate 9, the third protrusion 4b of the rack plate, the pin 9c of the rotation plate 9, and the L-shaped long hole 8d. When the mobile plate 8 is moved in the direction in which the worm wheel 7 meshes with the second gear 16 in order to carrier the disk, the pin 9c is positioned in the L-shaped long hole 8d. At this time the rotation plate 9 inhibits the movement of the pickup 3 via the rack plate 4 while the first and second protrusions 9a, 9b sandwiches the third protrusion 4b of the rack plate 4. By inhibiting the movement of the pickup 3 by the recess-protrusion fitting, the pickup can be firmly held at the position where the pickup is opposed to a lead-in area of the disk at non-playback time of the disk. As a result, the playback of the disk carried to the playback position can be quickly executed, and the pickup can be protected.

A trigger 27 is rotatably attached in the inner side of the substrate 1, and when the disk 10 is carried to the playback position, one end 27a of the trigger 27 is pushed to the outer periphery of the disk to be rotated so that through this rotation the other end 27b presses the control plate 13 so that the rack 13a of the control plate meshes with the sixth gear 22. The control plate 13, when being moved to one side by the sixth gear 22, operates a disk clamp mechanism which is not shown and works to release the state of sandwiching the disk 10 by the carrier roller 11 and the guide plate 26.

Figure 3:
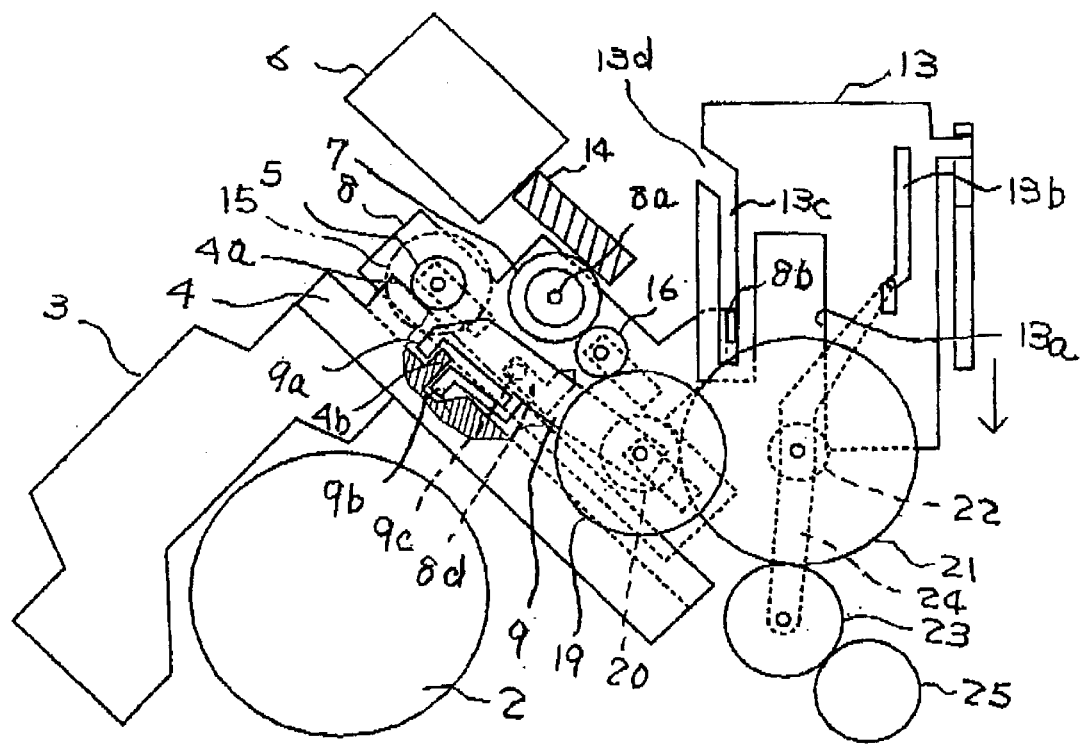
FIG. 3 is a view illustrating a rotation transmission state of the time a disk is carried to a playback position.

The operation to alternatively switch the path of power transmission to the pickup moving mechanism and the disk loading mechanism in which the common motor according to the first embodiment is employed is explained referring to FIG. 3 to FIG. 6. FIG. 3 shows a rotation transmission state of the motor of the time the disk is carried to the playback position. At this time the worm gear 14 is rotating while imparting thrust in the direction in which the worm wheel 7 is separated from the second gear 16. At this time since the bent piece 8b of the mobile plate 8 is accommodated in the long groove 13c of the control plate 13, the meshing state with the worm wheel 7 and the second gear 16 is maintained opposing to the thrust of the worm gear 14. The rotation of the motor 6 is transmitted from the worm gear 14 to the worm wheel 7 and the eighth gear 25 via the second gear 16, and the eighth gear 25 rotates the carrier roller 11.

In FIG. 3, the control plate 13 moves by being pressed by the trigger 27, and the sixth gear 22 and the rack 13a of the control plate engage and start moving toward the arrow direction. Thereafter, the control plate 13 moves toward the arrow direction so that the cam groove 13b rotates the support plate 24 to separate the seventh gear 23 from the eighth gear 25 to inhibit the rotation transmission of the motor 6 to the carrier roller 11. The control plate 13 further moves in the arrow direction, and the bent piece 8b reaches the opening 13d at the position where the control plate 13 reaches the end of the movement. At this time since the worm gear 14 is still imparting the thrust in the direction in which the worm wheel 7 separates from the second gear 16, the bent piece 8b can leave from the opening 13d. That is, the mobile plate 8 together with the worm wheel 7 immediately start moving to the arrow direction shown in FIG. 4.

By fitting the bent piece 8b provided in the mobile plate 8 into the long groove 13c of the control plate 13, even if the operation of carrying the disk to the playback position is halted to reverse the motor, since the meshing state with the worm wheel 7 and the second gear 16 is maintained as far as the bent piece 8b is accommodated in the long groove 13c, the disk can be discharged toward the insertion slot.

Figure 4:
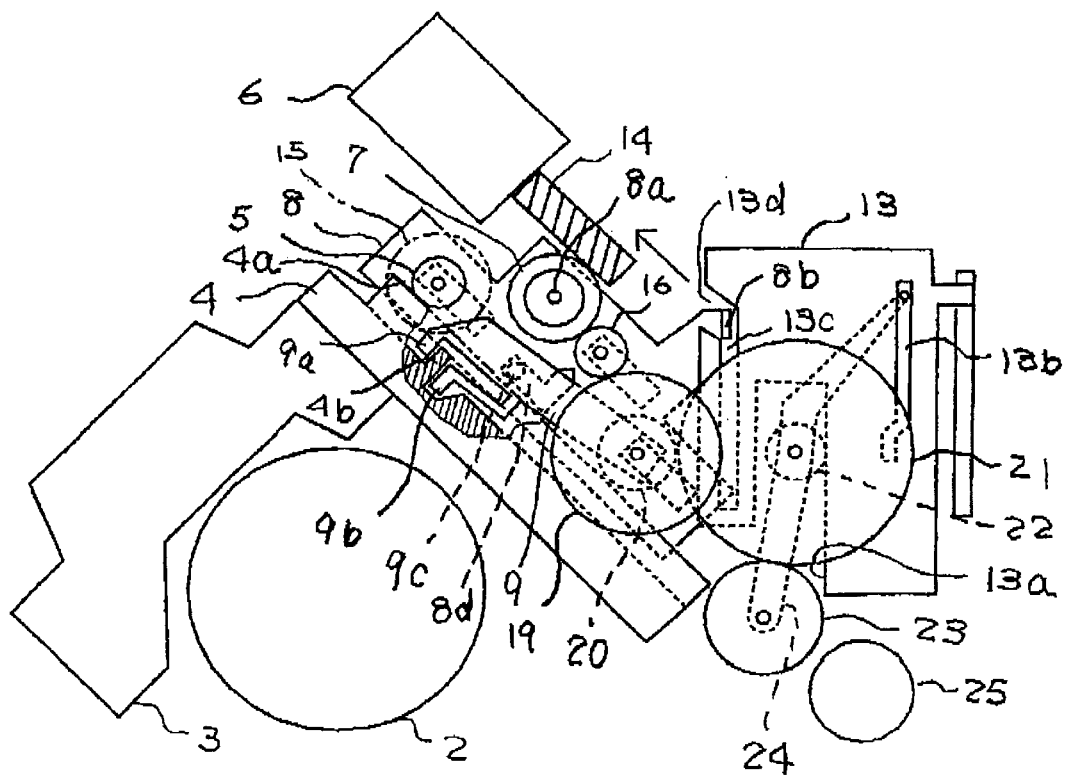
FIG. 4 is a view illustrating a state of the time locking of a movable member by a first lock mechanism is released.
Figure 5:
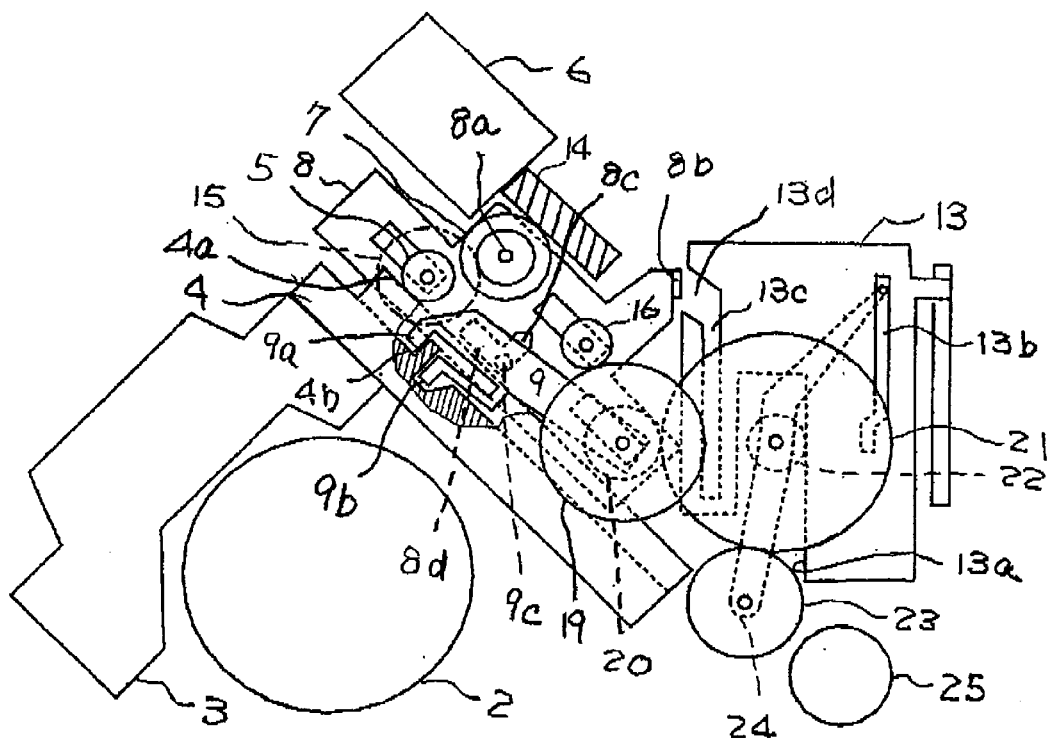
FIG. 5 is a view illustrating a state before locking by a second lock mechanism is executed.
Figure 6:
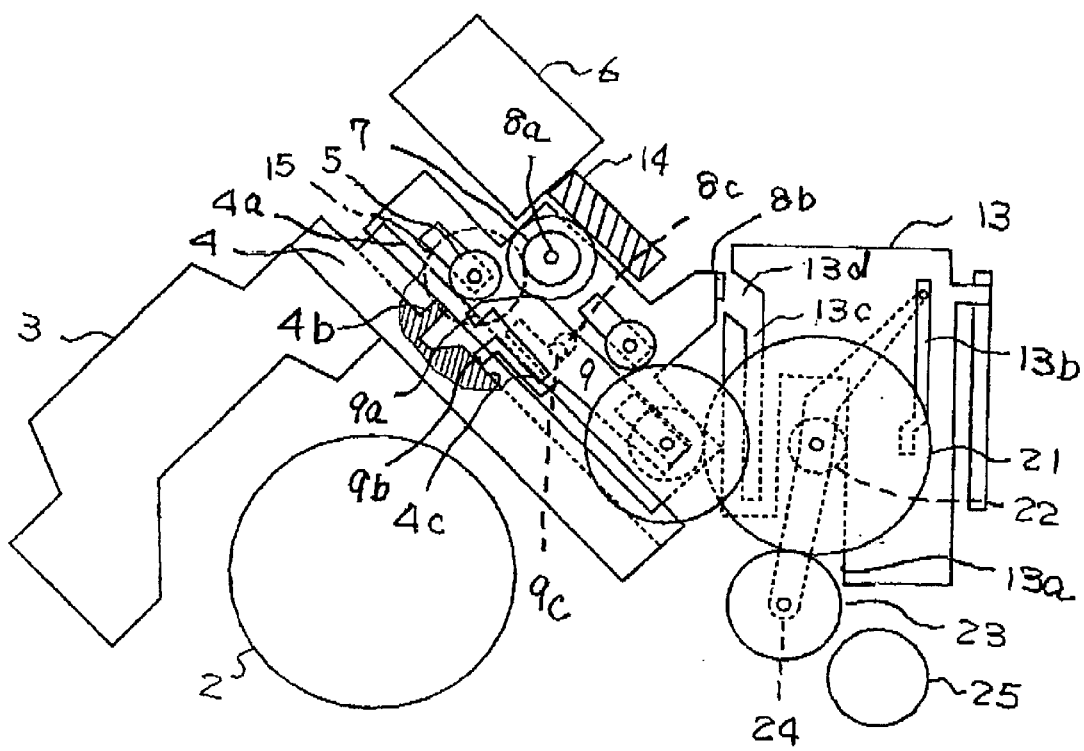
FIG. 6 is a view illustrating a state of the time locking of the movable member by the second lock mechanism is released.

Before the mobile plate moves to the arrow direction shown in FIG. 4, since the third protrusion 4b of the rack plate 4 is sandwiched between the first and second protrusions 9a, 9b of the rotation plate, the movement of the pickup 3 is completely inhibited. When the mobile plate 8 moves in the arrow direction shown in FIG. 4 so that the worm wheel 7 meshes with the first gear 15, the pin 9c of the rotation plate 9 opposes the recess 9c of the L-shaped hole as shown in FIG. 5. The rotation of the first gear 15 is transmitted to the rack plate 4 via the pinion 5. The rack plate 4 starts moving together with the pickup 4 since the rotation of the first gear 15 is transmitted. By the movement of the rack plate 4 the third protrusion 4b pushes up the first protrusion 9a to rotate the rotation plate 9 in a clockwise direction so that the pin 9c is accommodated in the recess 8c as shown in FIG. 6. Then, the mobile plate 8 is maintained in the state where the worm wheel 7 and the first gear 15 mesh with since the pin 9c is fitted into the recess 8c. Further, since the second protrusion 9b slidingly abuts the guide 4c, the meshing state between the worm wheel 7 and the first gear 15 can be maintained covering the whole movement area of the pickup.

Even when the rotation direction of the motor 6 is switched while the rack plate 4 is moving, the meshing state between the worm wheel 7 and the first gear 15 can be maintained during the time at which the rack plate does not move up to the initial position. In this case, even when the rotation direction of the motor 6 is switched, at the time of disk playback, since the meshing state between the worm wheel 7 and the first gear 15 can be maintained, the disk which is being reproduced can be repeatedly played. When the rack plate moves up to an initial position, the third protrusion 4b abuts the second protrusion 9b just before the rack plate reaches the initial position, and due to further movement of the rack plate 4 the third protrusion 4b rotates the rotation plate 9 in a counter-clockwise direction in FIG. 6. Accordingly, the pin 9c is pulled out of the recess 8c, and the third protrusion 4b is sandwiched between the first and second protrusions 9a, 9b.

As described above, in the disk player according to the first embodiment, the worm wheel 7 is supported by the rotatable mobile plate 8, the worm gear 14 attached to the rotary shaft of the motor 6 is meshed with the worm wheel 7, and the mobile plate 8 is moved in one direction or another by thrust of the worm gear 14 in accordance with the switching of the rotation direction of the motor 6 so that the worm wheel 7 alternatively meshes with the first gear 15 or the second gear 16. Thus, the switching of the rotation transmission path between the pickup moving mechanism and the disk loading mechanism can be reliably executed employing a small number of parts. Since the worm wheel 7 rotates while the rotation speed of the motor 6 is largely reduced, generation of gear noise is restrained.

Figure 7:
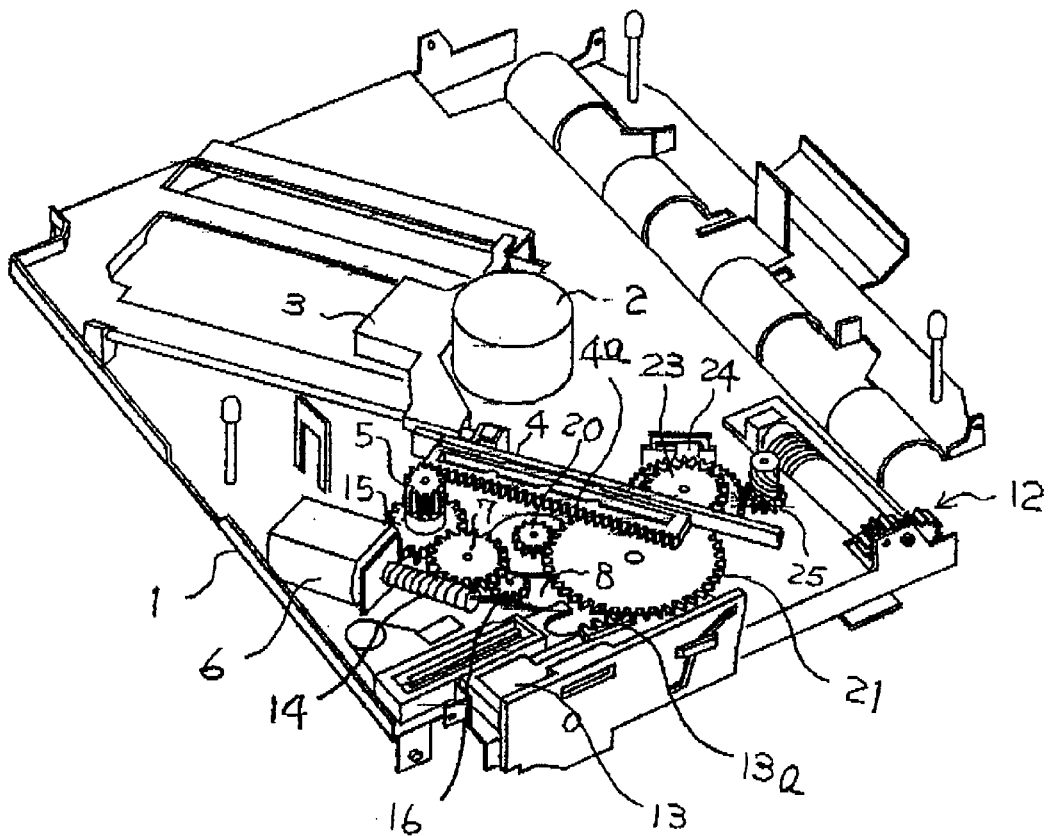
FIG. 7 is a perspective view in which a substrate of the disk player executed based on the first embodiment is seen from the backside of the substrate.

FIG. 7 shows the disk player that is fabricated based on the first embodiment, and the turntable 2 and the pickup 3 are attached in the backside of the substrate 1. Provided therein are the pinion gear 5 meshing with the rack 4a of the rack plate 4 of the pickup 3, the worm wheel 7 transmitting the rotation of the motor 6 to the pinion gear 5, the mobile plate 8 supporting the worm wheel 7, and the rotation plate 9 which regulates the movement of the rack plate 4 and which is not shown. On the substrate 1 provided are the roller driving gear group 12, 16, 20, 21, 23, 25 transmitting the rotation of the motor 6 to the carrier roller 11 which makes the disk 10 move between the insertion slot and the playback position of the disk and which is not shown and the control plate 13 interrupting the rotation transmission of the roller driving gear group after the disk is carried. By arranging all gears executing transmission of power of the motor 6 in the backside of the substrate, fabrication and repair of the power transmission system are made easy.

Figure 8:
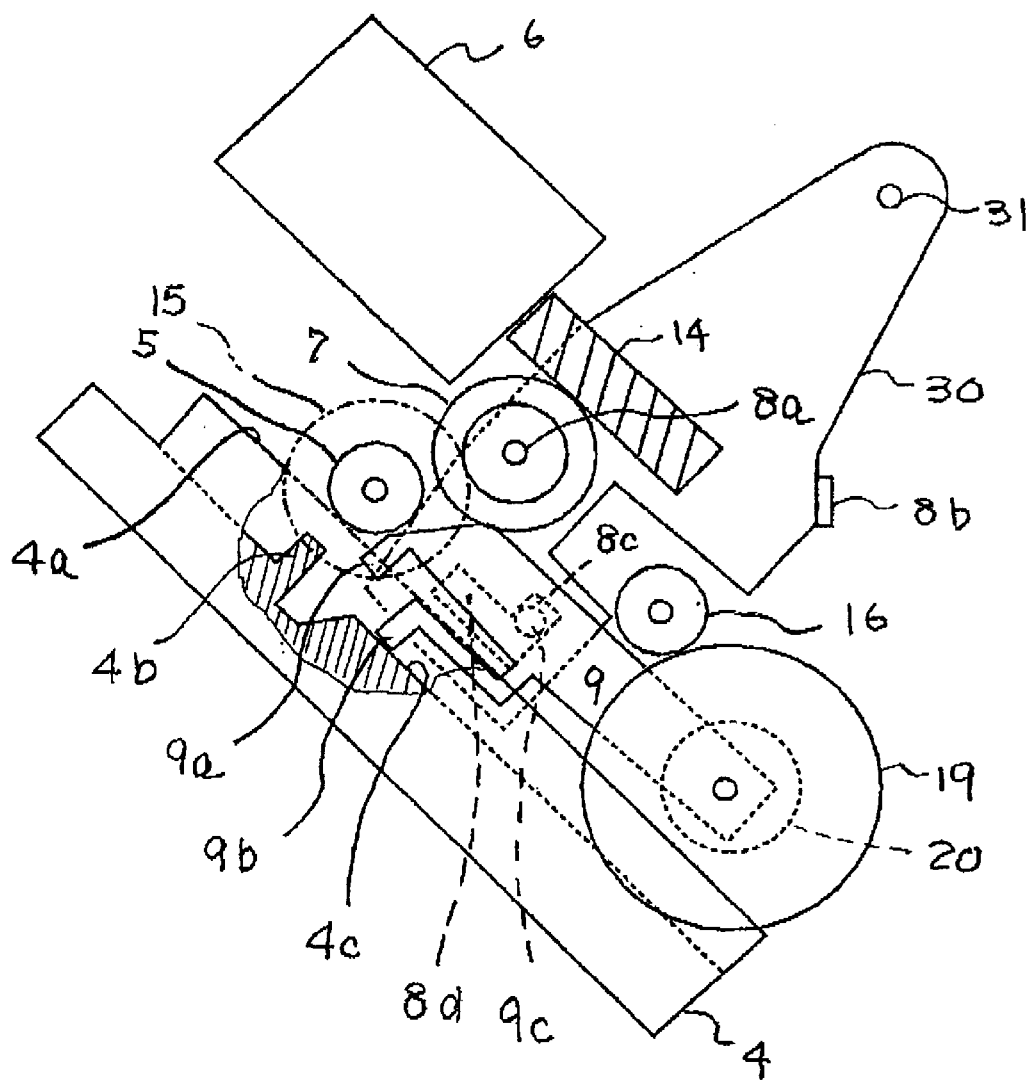
FIG. 8 is a view illustrating a second embodiment of a disk player of the present invention.

A second embodiment of the disk player of the present invention is shown in FIG. 8. The same components as those in the first embodiment are explained using like reference numerals. A worm gear 14 is attached to a motor 6, and a worm wheel 7 meshing with this worm gear 14 is attached to a rotatable swing plate 30. A rotational supporting point 31 of this swing plate 30 is supported on a substrate so that the rotational area of the swing plate 30 corresponds to the area in which the meshing state between the worm wheel 7 and the worm gear 14 is maintained. First and second gears 15, 16 that can alternatively engage when the worm wheel 7 swings are arranged in right and left of the worm wheel 7. A bent piece 8b and a L-shaped hole are provided on the swing plate 30. The shaft of the worm wheel 7 is rotatably supported to impart rotation resistance to the swing plate.

In this second embodiment, since the swing plate 30 supporting the worm wheel 7 is rotatably supported on the substrate 1, taking the rotational supporting point 31 as the center thereof, attachment to the substrate 1 becomes easy.

As described above, the disk player according to the present invention is constructed so that power of a motor is alternatively transmitted to a pickup moving mechanism and a disk loading mechanism via a worm wheel by attaching a worm gear on a rotary shaft of the motor and by supporting the worm wheel on a movable member that is reciprocatively movable in a direction approximately parallel to the axis of the worm gear to move the worm wheel together with the movable member by the thrust of the worm gear. At the time of operation of the disk loading mechanism the movement of the movable member is inhibited by a first movable member lock mechanism, and at the time of operation of the pickup moving mechanism the movement of the movable member is inhibited by a second movable member lock mechanism. As a result of this, since the worm wheel receives thrust from the worm gear and can reliably move between the pickup moving mechanism side and the disk loading mechanism side, the structure in which the power of the motor is alternatively transmitted to the pickup moving mechanism and the disk loading mechanism can be made simple.

By inhibiting the movement of the pickup by a pickup lock mechanism with the movement of the worm wheel from the pickup moving mechanism side to the disk loading mechanism, the movement of the pickup can be reliably inhibited at the time except the time of disk playback.

What is claimed is:

1. A disk player in which power of a motor is alternatively transmitted to a pickup moving mechanism and a disk loading mechanism in accordance with switching of a rotation direction of the motor to alternatively operate both the mechanisms, comprising:

a worm gear attached to a rotary shaft of the motor;

a movable member reciprocatively movable in a direction approximately parallel to the axis of the worm gear;

a worm wheel rotatably supported on the movable member to mesh with the worm gear to receive thrust from the worm gear to move together with the movable member to alternatively transmit the power of the motor to the pickup moving mechanism and the disk loading mechanism;

a first movable member lock mechanism for inhibiting the movement of the movable member with the operation of the disk loading mechanism; and a second movable member lock mechanism for inhibiting the movement of the movable member with the operation of the pickup moving mechanism.

2. The disk player according to claim 1, further comprising a pickup lock mechanism for inhibiting the movement of the pickup with the movement from a pickup moving mechanism side to a disk loading mechanism side of the worm wheel.

3. The disk player according to claim 2, wherein the movable member is movable along a linear guide.

4. The disk player according to claim 2, wherein the movable member is rotatable about a support shaft.

5. The disk player according to claim 1, wherein the movable member is movable along a linear guide.

6. The disk player according to claim 1, wherein the movable member is rotatable about a support shaft.

* * * * *